(12) United States Patent
Channing

(10) Patent No.: US 6,390,147 B1
(45) Date of Patent: May 21, 2002

(54) FUEL AND REDUCTANT DELIVERY SYSTEM

(75) Inventor: Derek Albert Channing, Livonia, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/681,664

(22) Filed: May 17, 2001

(51) Int. Cl.[7] ................................................ B65B 1/04
(52) U.S. Cl. .......................... 141/9; 141/100; 220/86.2
(58) Field of Search .......................... 141/9, 100, 104, 141/286, 234, 236, 237, 285, 301, 302, 94; 220/86.2, 86.3; 137/256, 262

(56) References Cited

U.S. PATENT DOCUMENTS

| 3,730,216 A | 5/1973 | Arnett et al. |
| 3,845,877 A | 11/1974 | Arnett et al. |
| 3,911,977 A | 10/1975 | Berger |
| 3,942,564 A | 3/1976 | Makazato |
| 5,178,197 A | 1/1993 | Healy |
| 5,406,995 A | * 4/1995 | Gantzer |
| 5,706,871 A | 1/1998 | Andersson et al. |
| 6,032,703 A | 3/2000 | Baker et al. |
| 6,041,965 A | 3/2000 | Smith |
| 6,142,744 A | 11/2000 | Taylor |
| 6,158,485 A | * 12/2000 | Meyer et al. |
| 6,216,755 B1 | 4/2001 | Neufert |

OTHER PUBLICATIONS

Baker et al., Urea Infrastructure for Control of Vehicular Nox Emissions (no date available).

* cited by examiner

Primary Examiner—Steven O. Douglas
(74) Attorney, Agent, or Firm—John D. Russell; Allan J. Lippa

(57) ABSTRACT

A system and a method for providing fuel and reductant to a vehicle from a fuel dispensing station are disclosed which allow for providing both fluids to a vehicle equipped with a fuel and reductant tank and allows for providing only fuel to a vehicle without a reductant tank.

19 Claims, 9 Drawing Sheets

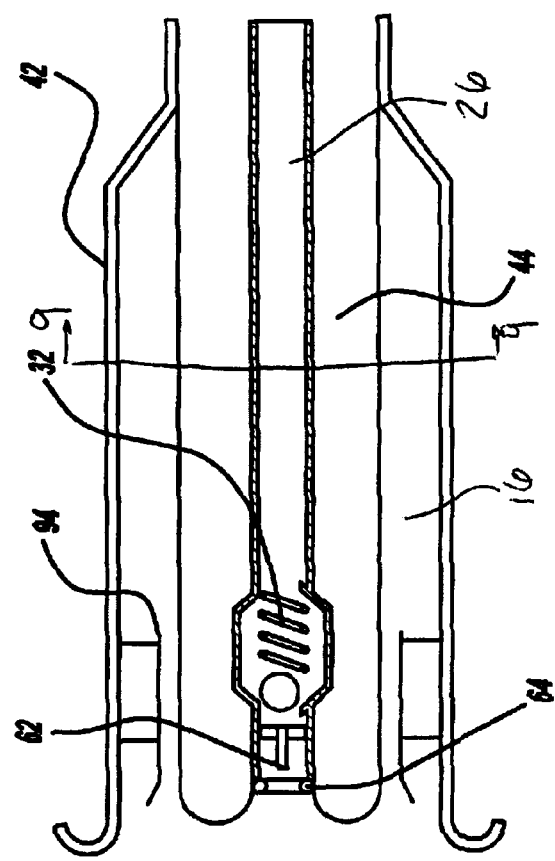

FUEL AND REDUCTANT DELIVERY SYSTEM

BACKGROUND OF THE INVENTION

The present invention relates to a system for intelligently supplying fuel to a vehicle, or when a vehicle is capable, both fuel and reductant.

Vehicles using diesel engines can be coupled with a lean NOx catalyst to reduce nitrogen oxide (NOx) emitted from the diesel engine. Lean NOx catalyst typically process NOx in the presence of a reducing agent, such as hydrocarbons, urea, aqueous ammonia, etc. If the reductant is other than diesel fuel, it can be provided from a separate tank, or reservoir, on-board the vehicle.

One known method of re-fueling the vehicle and replenishing a separate reductant reservoir uses a fuel pump (nozzle) that supplies both the reductant and the diesel fuel to the vehicle. However, the inventor herein has recognized a disadvantage with such an approach. In particular, such a pump cannot be used with diesel powered vehicles that do not have a separate reductant storage/delivery system. This results in duplicitous facilities and hardware in the fuel filling station, as well as conscious efforts by vehicle operators to ensure that the proper pump is used depending on the vehicle configuration.

Another known method is described in U.S. Pat. No. 6,032,703. In this system, a reductant is supplied when requested by the vehicle controller. However, the inventor herein has recognized that such an approach requires additional electronic hardware, which results in added cost and complexity. Further, such a system is only compatible with vehicles having the special electronics.

SUMMARY OF THE INVENTION

The disadvantages of prior approaches are overcome by a system for fueling a vehicle with means for delivering a first stream of fuel and a second, separate, stream of reductant to the vehicle when the vehicle is equipped with a fuel tank capable of receiving the first stream of fuel and a reductant tank capable of receiving the second stream of reductant. The system delivers only the first stream of fuel to the vehicle when the vehicle is not equipped with the reductant tank. The system may also contain an operator trigger coupled to the delivering means.

By providing only fuel for vehicles that cannot accept reductant, and both fuel and reductant for vehicles that can accept reductant, it is possible to have a single fueling system that is equally compatible. Further, this prevents operators from accidentally supplying reductant to non-reductant vehicles, as well as guaranteeing that reductant capable vehicle receive reductant when re-fuelled. Thus, an advantage of the present invention is a simple, ergonomic system that is compatible with various vehicles. In addition, this allows for reduced capital investment in developing fuel and reductant supply systems. Further still, a single operating filling action can supply both needed reductant and fuel. Finally, the present invention can be implemented without additional electronic hardware, thereby providing a cost effective solution.

BRIEF DESCRIPTION OF DRAWINGS

FIG. 7 is a sketch of an alternative embodiment of a dispensing nozzle and a filler neck, according to an aspect of the present invention;

FIG. 8 is a cross-section of the dispensing nozzle of FIG. 7, according to an aspect of the present invention;

FIG. 9 is a cross-section of the filler neck of FIG. 7, according to an aspect of the present invention;

DETAILED DESCRIPTION

Figure 1:
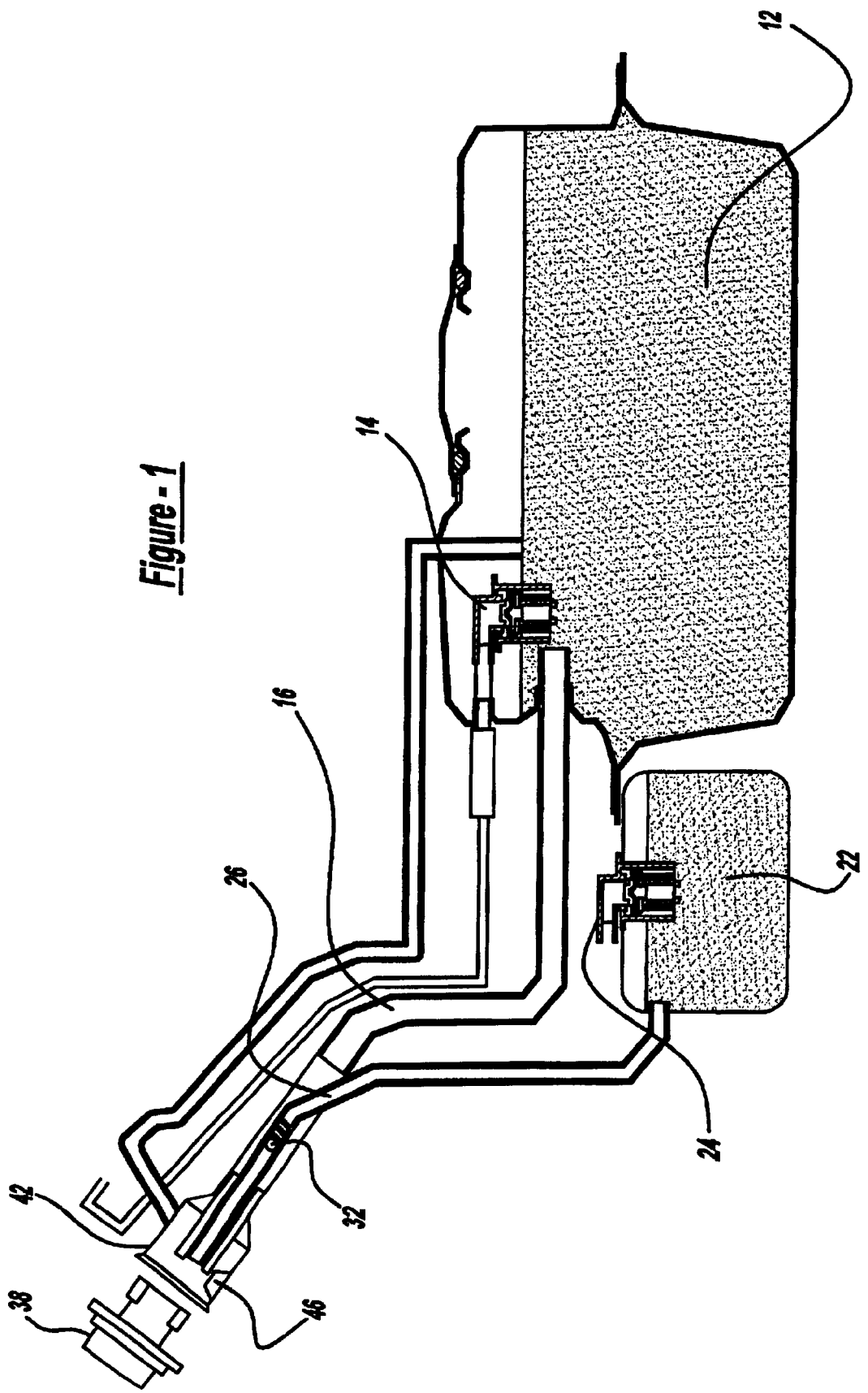
FIG. 1 is a sketch of primary and secondary fluid tanks and a filler neck through which the primary and secondary fluids are supplied to the tanks, according to an aspect of the present invention.

In FIG. 1, a primary fluid tank 12, which holds a primary fluid, and a secondary fluid tank 22, which holds a secondary fluid, are connected to filler neck 42 by primary filling passageway 16 and secondary filling passageway 26, respectively. Filler neck 42 is connected to the vehicle (not shown in FIG. 1) and provides the opening for dispensing fluids to the vehicle. Cap 38 fits onto filler neck 42.

Discriminator insert 44, which is attached to filler neck 42, may provide at least two functions. Discriminator insert 44 houses secondary fluid passageway 26, which conducts secondary fluid down filler neck 42 through check valve 32 and into secondary fluid tank 22. Check valve 32 opens under secondary fluid supply pressure. Alternatively, valve 32 could be a manually actuated valve. Also, discriminator insert 44 prevents the insertion of nozzles with inside diameter less than the diameter of discriminator insert 44 to ensure that only the proper nozzles are allowed to mate with the vehicle.

Combination vent valves 14 and 24 located in the primary and secondary fluid tanks, respectively, provide the following functions: shutoff of fuel dispensing provided by a float valve, pressure relief provided by a pressure relief valve set at a minimal pressure for the primary fluid tank, but at a pressure higher than supply pressure for the secondary fluid tank, vacuum relief provided by a vacuum valve which permits the entry of air as the fluid is consumed during normal vehicle operation, and spill prevention provided by a gravity valve.

Figure 2:
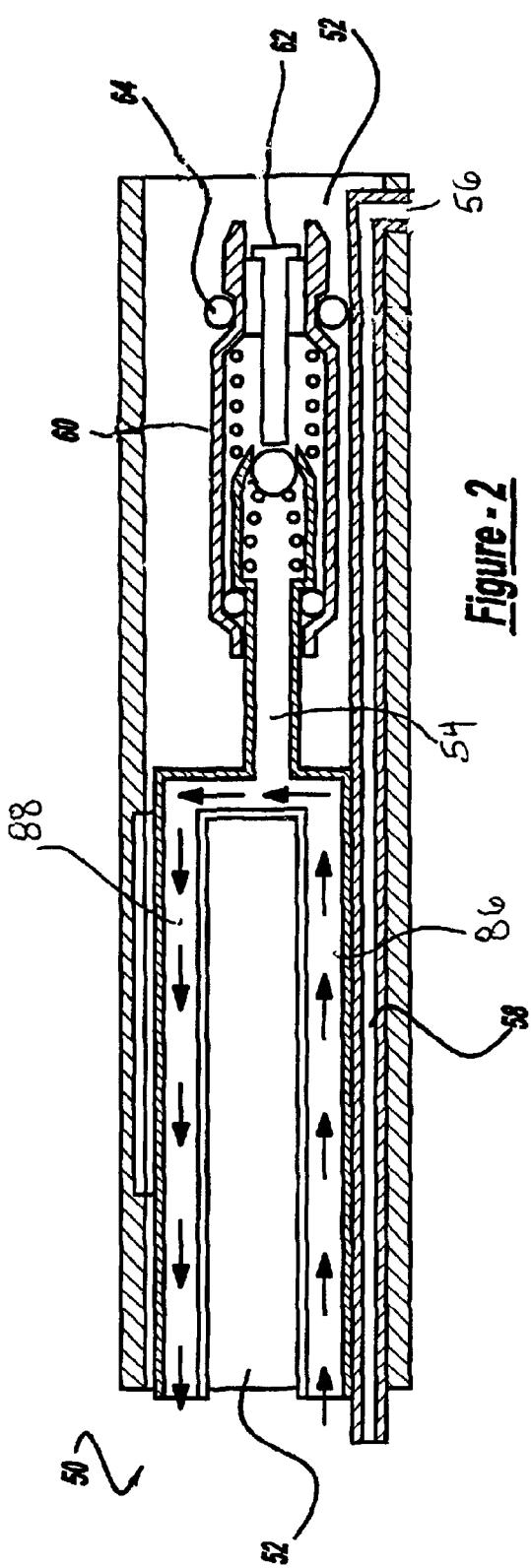
FIG. 2 is a sketch of a dispensing nozzle which is shutoff, according to an aspect of the present invention.

Referring to FIG. 2, dispensing nozzle 50 contains a secondary fluid dispensing passageway 54 which is supplied secondary fluid via a secondary fluid supply 86. A secondary fluid delivery valve 60 is located close to the opening of secondary fluid dispensing passageway 54 to prevent inadvertent release of the secondary fluid and to prevent inadvertent contamination of primary fluid with secondary fluid and vice versa. Dispensing nozzle 50 also contains primary fluid passageway 52. A primary fluid dispensing valve controlling the flow of the primary fluid through dispensing nozzle 50 is located upstream of dispensing nozzle 50. Vacuum shutoff passageway 58 connects between a vacuum source situated upstream of dispensing nozzle 50 (vacuum source not shown) and a vacuum shutoff sensor orifice 56. Flow of primary fluid through dispensing nozzle 50 continues until vacuum shutoff sensor orifice 56 is covered by fluid, that is, the tank is substantially full. At that point, a vacuum is developed within the vacuum shutoff passageway 58 causing the primary fluid dispensing valve (not shown) to shut off, thereby preventing further dispensing of the primary liquid.

Figure 3:
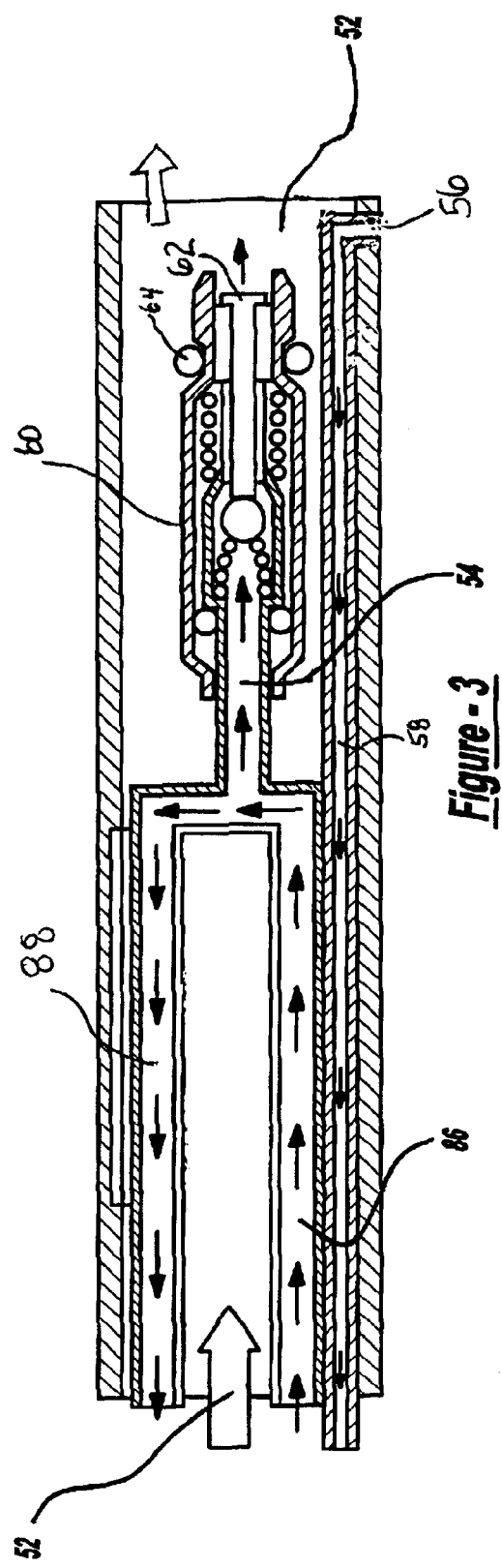
FIG. 3 is a sketch of a dispensing nozzle through which fluid is being dispensed, according to an aspect of the present invention.
Figure 6:
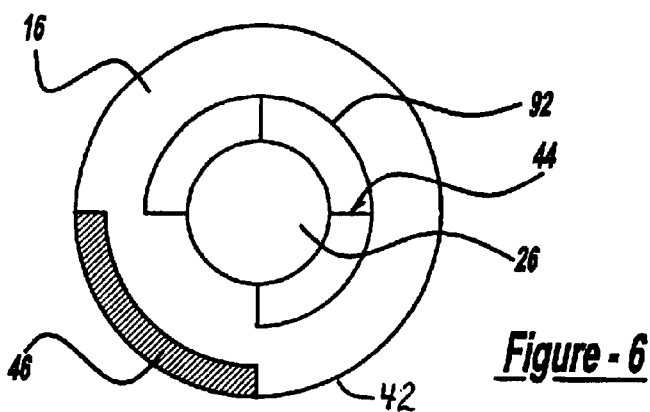
FIG. 6 is a cross-sectional of a filler neck, according to an aspect of the present invention.

The downstream section of dispensing nozzle 50 is radially symmetric, except for vacuum shutoff passageway 58, as shown in FIGS. 2 and 3. To dispense primary fluid, nozzle 50 is coupled to filler neck 42, a cross-section of which is shown in FIG. 6. Filler neck 42 contains a discriminator insert 44. Discriminator insert 44 may comprise multiple fins on the exterior surface of secondary fluid filling passageway 26. Vacuum passageway blocker sector 92, forms a partial ring around discriminator insert 44 except that a portion of the ring is removed; 90° of the circumference of a ring is missing in the present example. The portion of the ring that is removed provides space for vacuum shutoff passageway 58 of dispensing nozzle 50 when the two are coupled. Dispensing nozzle 50 is inserted into filler neck 42 with the centerline axes of both coincident with a range of radial orientations; a range of approximately +/−40°, in the present example. That is, vacuum shutoff passageway 58 mates with the removed sector of vacuum passageway blocker sector 92. Otherwise, vacuum shutoff passageway 58 would collide with vacuum passageway blocker sector 92 preventing coupling of dispensing nozzle 50 with filler neck 42.

The significance of the indexing function of vacuum passageway blocker 92 will become apparent in the following discussion; the inventor of the present invention has envisioned an additional use for the vacuum shutoff apparatus, which will become apparent in regards to FIGS. 5*a–c* in which engagement of dispensing nozzle 50 and filler neck 42 is considered. When dispensing nozzle 50 mates with filler neck 42, the asymmetric features on each, the vacuum shutoff passageway 58 and the vacuum passageway blocker 92, respectively, allow insertion in only a range of orientations. Filler neck 42 has an inhibitor pad 46 covering a sector of the interior surface of filler neck 42, shown in cross-section FIG. 6 as 90°. During insertion of dispensing nozzle 50 into filler neck 42, vacuum shutoff sensor orifice 56 is covered by inhibitor pad 46, thereby causing a vacuum to be developed in vacuum shutoff passageway 58 preventing the primary fluid from being dispensed. The length of inhibitor pad 46 is such that when dispensing nozzle 50 is fully inserted into filler neck 52, vacuum shutoff sensor orifice is beyond inhibitor pad 46, thus allowing primary fluid to be dispensed. The term fully inserted herein means that dispensing nozzle 50 is inserted such that secondary fluid dispensing passageway 54 and secondary fluid filling passageway 26 are coupled to allow dispensing of secondary fluid.

Figure 5A:
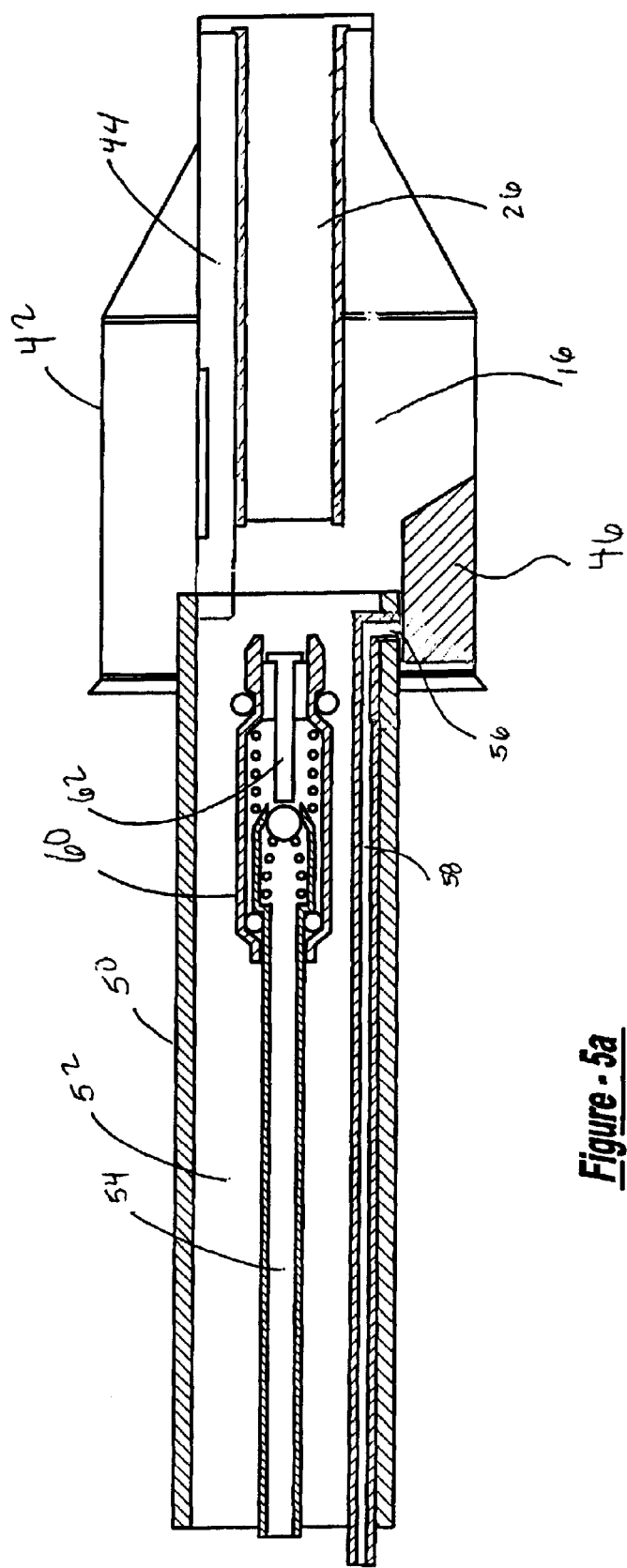
FIG. 5a is a sketch of a dispensing nozzle uncoupled to a filler neck.
Figure 5B:
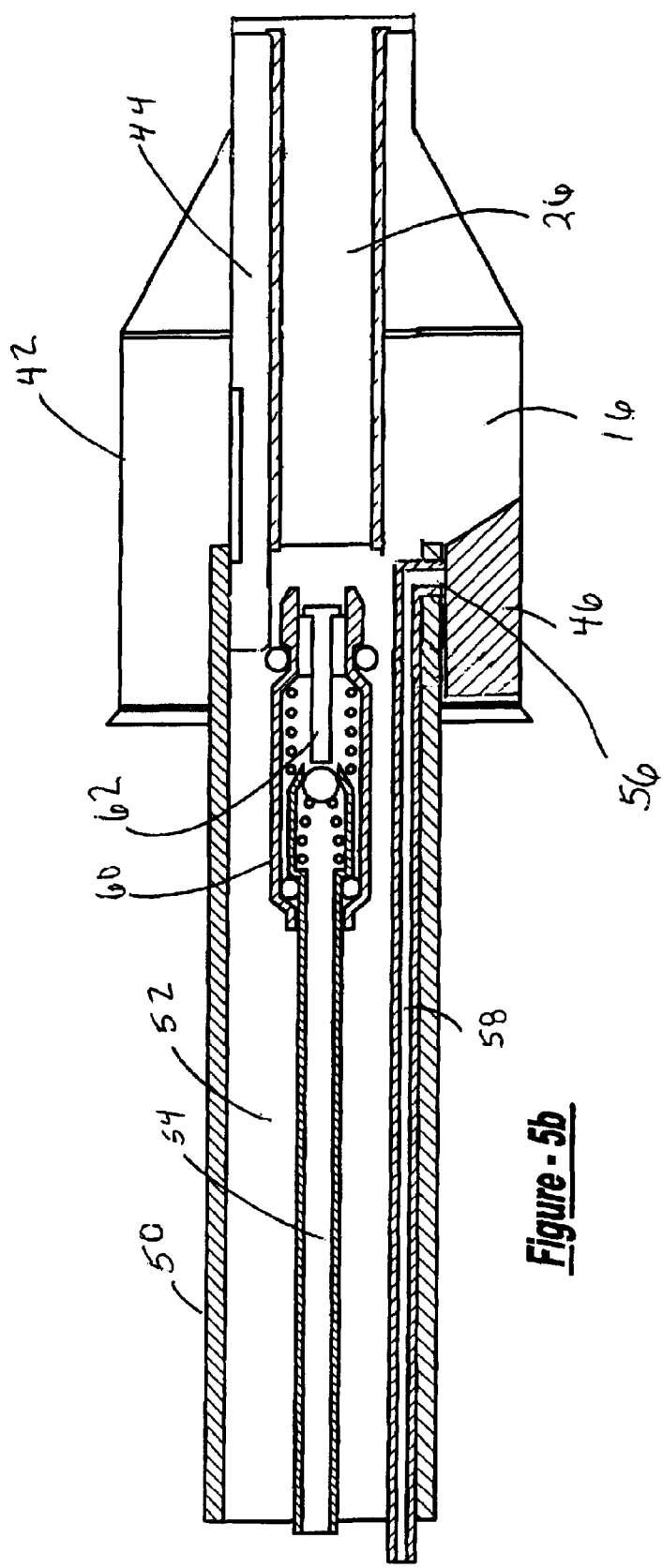
FIG. 5b is a sketch of a dispensing nozzle partially coupled to a filler neck, without dispensing primary or secondary fluids, according to an aspect of the present invention.
Figure 5C:
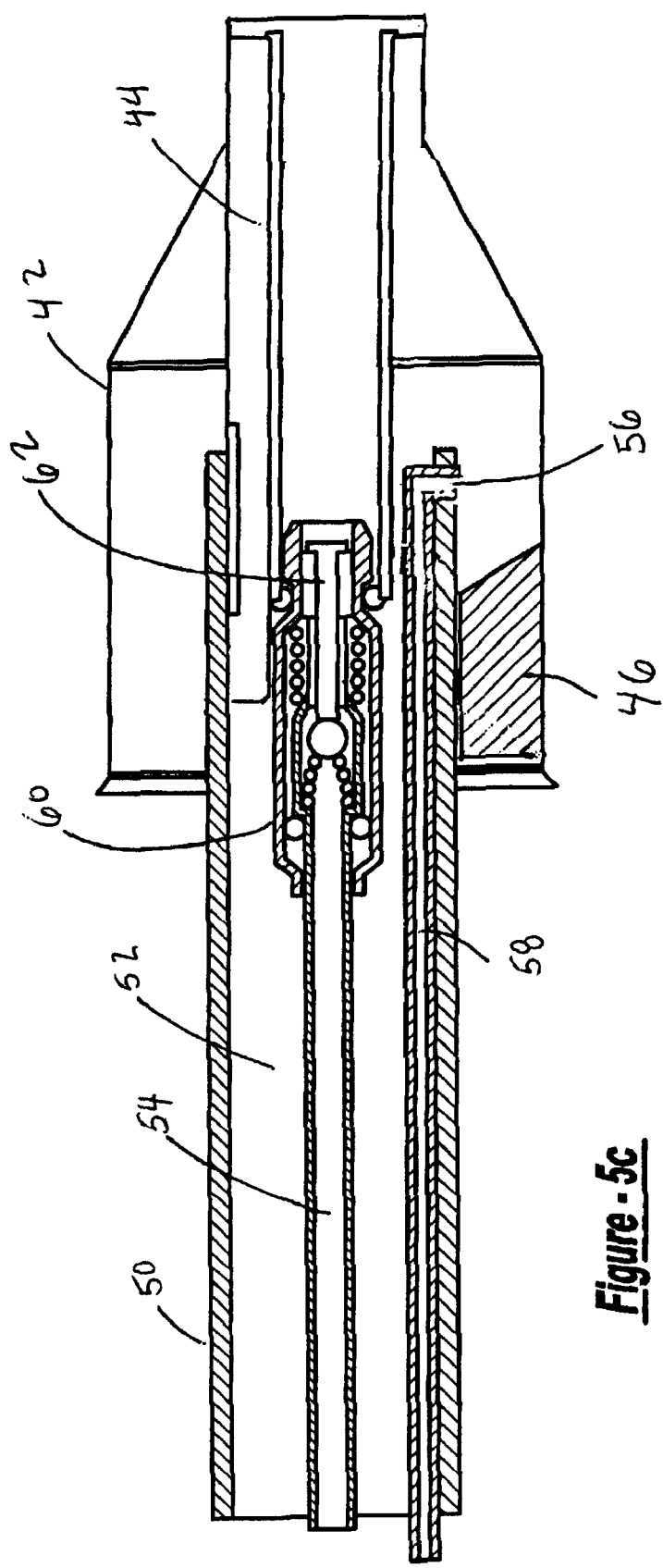
FIG. 5c is a sketch of a dispensing nozzle coupled to a filler neck, allowing dispensing primary and secondary fluids, according to an aspect of the present invention.

Referring now to FIGS. 5*a–c*, in FIG. 5*a*, dispensing nozzle 50 and filler neck 42 are not coupled and neither fluid is flowing. The primary fluid is prevented from flowing due to vacuum shutoff sensor orifice 56 being covered by inhibitor pad 46. The secondary fluid is prevented from flowing due to secondary fluid delivery valve 60 being in its normally closed position. In FIG. 5*b*, dispensing nozzle 50 and filler neck 52 are partially coupled. Again, primary fluid is prevented from being dispensed by vacuum shutoff sensor orifice 56 being covered by inhibitor pad 46. Fluid separation seal 64 mates with the secondary fluid filling passageway 26. However, secondary fluid delivery valve 60 remains closed. In FIG. 5*c*, both fluid passageways are coupled and both fluids may be dispensed. The primary fluid is allowed to flow because vacuum shutoff sensor orifice 56 is inserted beyond inhibitor pad 46. Secondary fluid is allowed to flow because secondary fluid delivery valve 60 has been mechanically opened by delivery valve opening pin 62; specifically, fluid separation seal 64 prevented further movement of the tip of the secondary fluid delivery valve 60 beyond that illustrated in FIG. 5*b*. Consequently, the internal spring of secondary fluid delivery valve 60 is compressed and delivery valve opening pin 62 forces the opening of the valve by pushing the valve's ball from its seat. Fluid separation seal 64 prevents intermixing of the two fluids during dispensing.

An alternative embodiment of dispensing nozzle 50 and filler neck 42 is shown in FIG. 7. In this embodiment, primary fluid is prevented from being dispensed until secondary fluid is concurrently dispensed, with a difference from the embodiment described above being that dispensing nozzle 50 may be coupled to filler neck 42 in any angular position, i.e., no indexing. In FIG. 7, a secondary fluid supply 86 and return 88 are provided to secondary fluid dispensing passageway 54. Delivery valve opening pin 62 is shown installed in filler neck 42. A cross-section of dispensing nozzle 50 is shown in FIG. 8 showing secondary fluid supply 86, secondary fluid return 88, vacuum shutoff passageway 58, and primary fluid dispensing passageway 52. Filler neck 42 contains an inhibitor ring 94 on the internal surface. Inhibitor ring 94 substantially prevents primary fluid to be dispensed unless dispensing nozzle is inserted sufficiently into filler neck 42 so that vacuum shutoff sensor orifice 56 is inserted beyond inhibitor ring 94. When dispensing nozzle 50 is inserted sufficiently to allow primary fluid to be dispensed, delivery valve opening pin 62 opens secondary fluid delivery valve 32 causing the secondary fluid to be dispensed immediately. A cross-section of filler neck 42 is shown in FIG. 9 indicating blocker ring 94 extends around the circumference of the filler neck 42. FIG. 9 shows three fins for discriminator insert 44, by way of example. Any plurality of fins for discriminator insert 44 may be used. Discriminator insert 44 provides support for secondary fluid passageway, as shown in FIG. 7. Primary fluid filling passageway 16 comprises the space inside inhibitor ring 94 which is external to secondary fluid filling passageway 26 excluding space occupied by discriminator insert 44.

If the present invention is used on a diesel vehicle, in which primary fluid tank 12 contains diesel fuel, and secondary fluid tank 22 contains reductant, it is desirable that the operator be disallowed from filling primary tank 12 without also filling secondary tank 22. The location of pad 46 is such that during the procedure of inserting dispensing nozzle 50 into filler neck 42, secondary fluid delivery valve 60 and check valve 32 are opened causing secondary fluid to flow prior to vacuum shutoff sensor orifice 56 being uncovered by inhibitor pad 46. This ensures that primary fluid tank 12 may not be supplied fuel without secondary fluid tank 22 being supplied reductant. The clearances between dispensing nozzle 50 and inhibitor pad 46 as well as inhibitor pad material are selected to ensure that when vacuum shutoff sensor orifice 56 is in the proximity of inhibitor pad 46, that inhibitor pad 46 covers vacuum shutoff sensor orifice 46 sufficiently such that a vacuum is developed in vacuum shutoff passageway 58 to restrict the flow of primary fluid.

It is desirable that dispensing nozzle 50 be able to dispense a primary fluid to a prior generation vehicle, that is, one which does not use a secondary fluid. Because the filler neck of a prior generation vehicle does not contain inhibitor pad 46 or inhibitor ring 94, vacuum shutoff sensor orifice 56 is not covered and the vacuum shutoff does not prevent dispensing the primary fluid. Furthermore, the filler neck of a prior generation vehicle does not contain a secondary fluid filling passageway 26 which would actuate the secondary fluid delivery valve 60. Thus, the present invention provides for dispensing only primary fluid to prior generation vehicles, that is, those without secondary fluid tanks 22.

Both embodiments described above provide for disallowing dispensing a primary fluid, which may be diesel fuel, to a vehicle which is equipped with a secondary fluid tank, the secondary fluid tank may store reductant. Primary fluid is prevented from being dispensed by occluding vacuum shutoff sensor orifice 56. Prior generation vehicles, which do not contain a secondary fluid tank, are able to be fuelled with the system of the present invention as it would not contain an inhibitor pad 46 or inhibitor ring 96 in its filler neck 42. Thus, the present invention allows for both types of vehicles to be dispensed appropriate fluids to replenish their tanks. Furthermore, intervention on the part of the operator to provide the distinction is avoided. An additional advantage of the above described embodiments is that addition of secondary fluid is provided for without operator intervention and secondary fluid tank replenishment is accomplished during primary fluid dispensing intervals.

Figure 10:
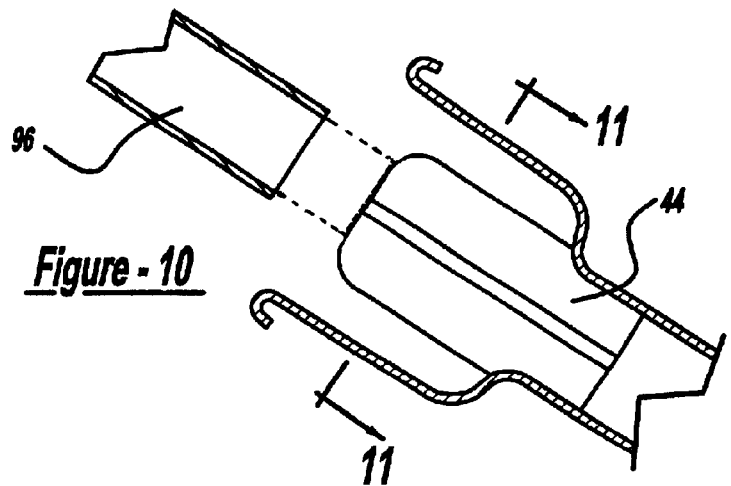
FIG. 10 is a sketch of a dispensing nozzle and a filler neck, according to an aspect of the present invention.
Figure 11:
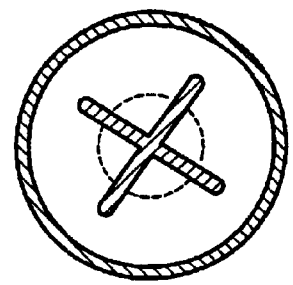
FIG. 11 is a cross-section of the filler neck of FIG. 10, according to an aspect of the present invention.
Figure 12:
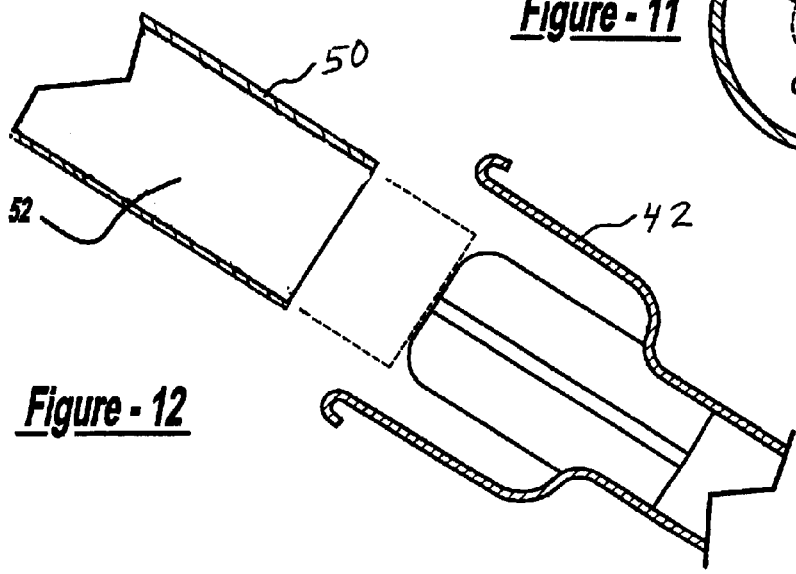
FIG. 12 is a sketch of a dispensing nozzle and a filler neck, according to an aspect of the present invention.

In prior art diesel fuel dispensing systems, petrol (alternatively called gasoline) may be added to diesel fuel tanks with serious potential for negative consequences: potential ruin of the fuel injection hardware and the engine. The present invention, which includes inhibitor insert 44, prevents such unintended misfueling when the outside diameter of inhibitor insert 44 is purposely greater than an inside diameter of the petrol dispensing nozzle. Because the operator is prevented from inserting the gasoline nozzle into filler neck 42 and would, thus, suspect a problem by the inability of a gasoline nozzle to be inserted into filler neck 42. Referring to FIG. 10, an alternative fluid dispensing nozzle 96 is shown. Because the inside diameter of alternative fluid dispensing nozzle 96 is smaller than the outside diameter of discriminator insert 44, alternative fluid dispensing nozzle 96 cannot be inserted into filler neck 42. The cross-section of filler neck 42 is shown in FIG. 11, showing discriminator insert 44 as a four-pointed star. Discriminator insert 44 may have a minimum of two points to perform the desired function. Referring to FIG. 12, the inside diameter of dispensing nozzle 50 is large enough to mate with discriminator 44. Consequently, a vehicle equipped with discriminator insert 44 permits insertion of dispensing nozzles 50 of appropriate diameter only. FIGS. 11 and 12 indication a general application of a discriminator insert, regardless of whether the dispensing system is for single or multiple fluid.

It is desirable that the operator of a vehicle equipped with both primary fluid tank 12 and secondary fluid tank 22 uses a fuel dispensing station which provides for both tanks to be replenished. To prevent the operator from using a dispenser of primary fluid which does not also have the facility for filling of the secondary fluid, the outside diameter of inhibitor insert 44 is greater than the inside diameter of diesel-only dispensing nozzles. In this way, the operator may be prevented from dispensing a primary fluid without, at the same time, filling secondary fluid tank 22.

In summary, discriminator insert 44 may be used to prevent petrol being dispensed into a diesel-equipped vehicle. Another advantage, which may be provided by discriminator insert 44, is that vehicles equipped with reductant tanks may be prevented from fueling at diesel-only fuel dispensing stations.

Filler neck 42 and dispensing nozzle 50 may be fabricated of electrically conductive materials. Specifically, vacuum shutoff passageway 58 of dispensing nozzle 50 and inhibitor pad 46 (or inhibitor ring 94 in the alternative embodiment), i.e., elements such as these examples, which are in contact when dispensing occurs, may be made of electrically conductive materials.

Secondary fluid tank 22 may contain an aqueous solution of ammonia or urea, which freezes at 12° C. and is predominantly comprised of water and, thus, expands upon freezing. Although the shape of secondary fluid tank 22 in FIG. 1 is of a conventional shape, secondary fluid tank 22 may be that of a frustum of a cone with the larger diameter cross-section elevated higher than the smaller diameter cross-section.

Tanks with cross-sectional area increasing monotonically from the bottom of the tank to the top of the tank allow expansion space for fluids which expand upon freezing. Although occasional freezing of the urea may occur under unusual climatic conditions during vehicle soak periods, the urea tank may be installed proximately to a heat rejecting element in the vehicle such that it attains a temperature greater than 12° C. readily upon reactivation of the vehicle 10. Heat rejecting elements may be an engine, a radiator, an oil pan, an exhaust element, as examples.

Figure 4:
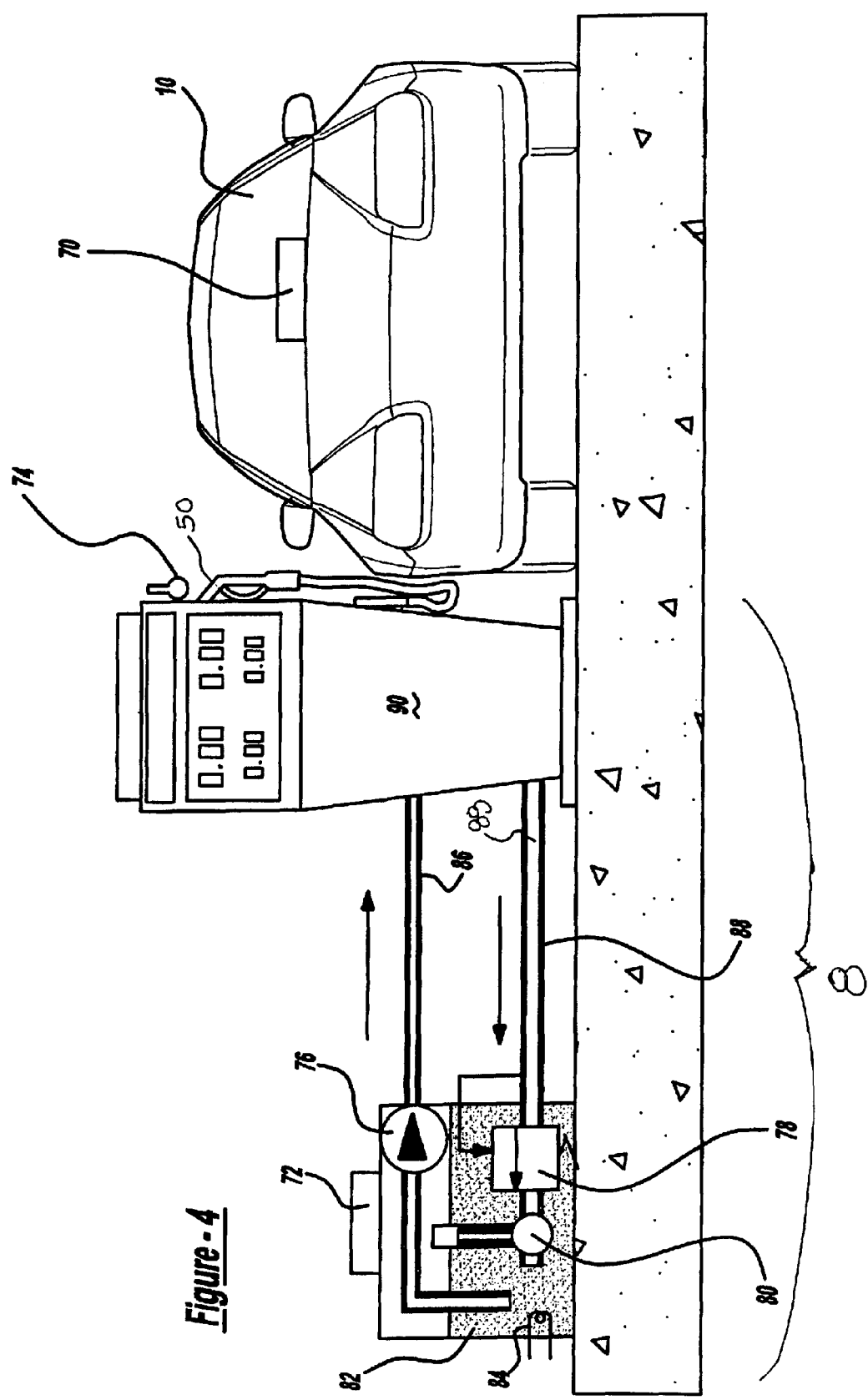
FIG. 4 is a sketch of a vehicle at a dispensing station, according to an aspect of the present invention.

Freezing of urea in the dispensing system may be avoided by circulating urea through dispensing nozzle 50 via a secondary fluid supply 86 and a secondary fluid return 88, as shown in FIGS. 2, 3 and 7. If urea reservoir 82 is underground, urea is maintained at a temperature of about 10–15° C. By circulating flow within dispensing nozzle 50, freezing of the urea is prevented, expect, perhaps, at the very lowest ambient temperature conditions. If urea reservoir 82 is above ground, as shown in FIG. 4, a secondary fluid heater 84 may be employed to maintain a desired temperature to prevent freezing of urea. Temperature sensor 74 may be relied upon to determine when to require a circulating flow should be pumped through secondary fluid supply 86 and secondary fluid return 88 by secondary fluid pump 76 and when secondary fluid heater 84 should be employed. Alternatively, a signal from a secondary fluid outlet temperature sensor 80 may be used to determine requirements for circulating flow and heating of the secondary fluid.

Fluid delivering and receiving means are discussed above in reference to FIGS. 1–5. Possible other means include, but are not limited to: pumps, electronic actuators, support brackets, springs, valves, reservoirs, tubing, tubing connectors, fittings, pressure sensing devices, fluid level sensing devices. The shutoff apparatus for dispensing the primary fluid has been discussed above. However, a solution should be provided for ceasing flow to secondary tank 22 when it is full. When secondary tank 22 is full, combination vent valve 24 closes causing pressure in secondary tank 22 to equal delivery pressure, thereby causing flow to cease. Secondary tank 22 may be designed to withstand the delivery pressure without rupturing. The dispensing system may contain a secondary fluid pressure regulator 78 on the supply side to maintain a predetermined pressure less than a design pressure of secondary tank 22.

When dispenser nozzle 50 is uncoupled from filler neck 42, check valve 32 in secondary fluid filling passageway 26 prevents secondary fluid from contaminating primary fluid filling passageway 16. Preferably, check valve 32 should be as close to the inlet tip of secondary fluid filling passageway 26 to minimize contamination between primary and secondary fluids.

Alternatively, a level sensor (not shown) on secondary tank 22 may communicate to a transponder 70 on vehicle 10, FIG. 4. Transponder 70 may send a signal indicating fluid level to a transceiver 72 coupled to secondary fluid reservoir 82 and secondary fluid pump 76. When secondary tank 22 is full, a valve (not shown), located upstream of dispensing nozzle 50, is commanded to cease delivery of the secondary fluid.

Mechanical solutions by which the flow of primary fluid is prevented prior to initiating flow of a secondary flow is discussed above. Other examples can also be used. If vehicle 10 and fuel dispensing system 8 are fitted with radio communication, i.e., transponder 70 and transceiver 72, respectively, an electrically-actuated valve in primary fluid dispensing passageway 52 could prevent primary fluid flow until secondary fluid flow is occurring. The dispensing status of the secondary fluid could be sensed by flow metering onboard the dispensing system and a level sensor on the secondary tank. Alternatively, valves in the primary and secondary passageways in the dispenser could be mechanically coupled.

An example of a solution to automatic shutoff is discussed in reference to FIG. 4. Additional automatic shutoff means may include: electrically actuated valves, pressure sensing devices, fluid level sensing devices, piping, connectors, and electronic actuators.

The volume of secondary fluid tank 22 is sized to ensure that secondary fluid is substantially always available. If the volume of secondary fluid tank 22 is determined based on the product of the volume of primary fluid tank 12 and R, where R is the maximum ratio of the consumption rate of secondary fluid divided by the consumption rate primary fluid encountered over the vehicle's operating range. If it is found in development that the volume of secondary fluid tank 22 based on R is larger than necessary for vehicle 10, even when considering engine operating scenarios consuming the greatest fraction of secondary fluid, the volume of secondary fluid tank 22 may be reduced accordingly.

Figure 13:
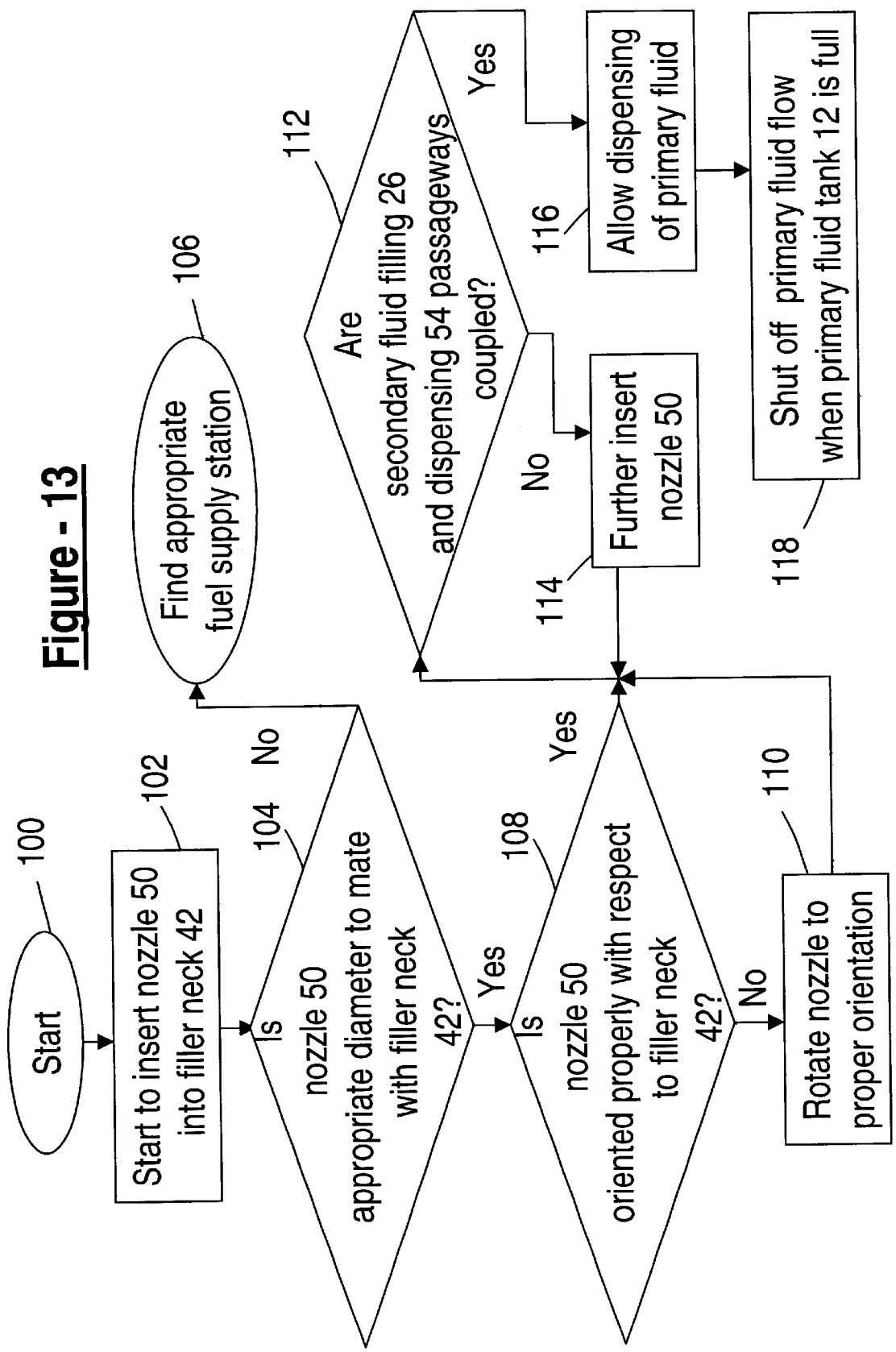
FIG. 13 is a flowchart showing a fueling procedure, according to an aspect of the present invention.

The processes undertaken in dispensing are shown in FIG. 13. The process is initiated in block 100. Dispensing nozzle 50 is engaged with insert 44 of filler neck 42 in block 102 by an operator of the fluid dispensing station. In block 104, it is determined whether dispensing nozzle 50 is of the appropriate diameter to mate with filler neck 42. If not, this indicates that the dispensing nozzle 50 does not contain the appropriate fluid type for vehicle 10. In this case, the operator locates an alternate fuel facility in block 106. In the event of a positive result from block 104, control proceeds to block 108 in which it is determined whether dispensing nozzle 50 is properly indexed with filler neck 42. A negative result in block 108 is indicated when vacuum shutoff passageway 58 of dispensing nozzle 50 interferes with inhibitor pad 46 of filler neck 42. If improper indexing has occurred (negative result in block 108), the operator rotates nozzle 50 with respect to filler neck 42, in block 110, until engagement is possible and a positive result in block 108 is achieved. A positive result in block 108 indicates that dispensing nozzle 50 is engaged with insert 44, it is determined in block 112 whether nozzle 50 is engaged far enough to allow dispensing of secondary fluid, i.e., are filling and dispensing passageways of the secondary fluid passageways coupled. If not, the operator inserts dispensing nozzle 50 farther into filler neck 42, in block 100. If a positive result in block 108, primary fluid and secondary fluid dispensing is permitted in block 112. When the fluids have been dispensed, a valve on the primary dispensing passageway (not shown) automatically shuts off, as provided by the mechanical structure described above in regards to FIGS. 5a–c. When nozzle 50 is removed from filler neck 42 by the operator, valves 32 and 60 in the urea passageway return to their normally closed positions, as made possible according to an aspect of the present invention, as described in regards to FIGS. 5a–c.

The embodiments discussed above refer to dispensing two fluids through a single nozzle. However, the invention discussed herein may be extended to dispense three or more fluids through a single nozzle.

While several modes for carrying out the invention have been described in detail, those familiar with the art to which this invention relates will recognize alternative designs and embodiments for practicing the invention. Thus, the above-described preferred embodiments are intended to be illustrative of the invention, which may be modified within the scope of the following claims.

What is claimed is:

1. A method for fueling a vehicle, the method comprising:
   delivering a first stream of fuel and a second, separate, stream of reductant to the vehicle when the vehicle is equipped with a fuel tank capable of receiving said first stream of fuel and a reductant tank capable of receiving said second stream of reductant; and
   delivering only said first stream of fuel to the vehicle when the vehicle is not equipped with said reductant tank.

2. The method of claim 1 wherein said fuel and said reductant remain separated during said step of delivering of said fuel and said reductant.

3. The method of claim 1 wherein a nozzle capable of delivering said first stream and said second stream has a first stream delivery passageway and a second stream deliver passageway.

4. The method of claim 3 wherein a filler neck coupled to the vehicle has a first stream receiving passageway for receiving said fuel and a second stream receiving passageway for receiving said reductant when the vehicle is equipped with said reductant tank, further comprising the step of allowing said step of delivering said first stream and said second stream when said first stream delivery passageway is coupled to said first stream receiving passageway and said second stream delivery passageway is coupled to said second stream receiving passageway.

5. The method of claim 4, further comprising the step of preventing said step of delivering said first stream and said second stream when said first stream delivery passageway is decoupled from said first stream receiving passageway.

6. The method of claim 4, further comprising the step of preventing said step of delivering said first stream and said second stream when said second stream delivery passageway is decoupled from said second stream receiving passageway.

7. The method of claim 3 wherein a filler neck coupled to the vehicle has a first stream receiving passageway for receiving said fuel and no second stream receiving passageway when the vehicle is not equipped with said reductant tank, further comprising the step of allowing said step of delivering only said first stream of fuel when said first stream delivery passageway is coupled to said first stream receiving passageway.

8. A the method of claim 7, further comprising the step of preventing delivery of said second stream of reductant when the vehicle is not equipped with said reductant tank.

9. A system for fueling a vehicle comprising:
   means for delivering a first stream of fuel and a second, separate, stream of reductant to the vehicle when the vehicle is equipped with a fuel tank capable of receiving said first stream of fuel and a reductant tank capable of receiving said second stream of reductant; and, delivering only said first stream of fuel to the vehicle when the vehicle is not equipped with said reductant tank; and
   an operator trigger coupled to said delivering means.

10. The system of claim 9 wherein said delivering means comprises a nozzle having a first stream delivery passageway, a second stream delivery passageway, a vacuum passageway, and an orifice on the periphery of the nozzle, said orifice is coupled to said vacuum passageway.

11. The system of claim 10 wherein said delivering means further comprises a first valve coupled to said first stream delivery passageway, said first valve is coupled to said operator trigger and to said vacuum passageway.

12. The system of claim 11 wherein said first valve is opened when said operator trigger is actuated and a pressure in said vacuum passageway is substantially atmospheric pressure.

13. The system of claim 12, further comprising:
   a filler neck coupled to an exterior surface of the vehicle;
   a first stream receiving passageway which couples said fuel tank to said filler neck;
   a second stream receiving passageway which couples said reductant tank to said filler neck when the vehicle is equipped with said reductant tank; and
   a second valve disposed in said second stream receiving passageway proximate to the upstream end, said valve prevents substantial mixing between said fuel and said reductant.

14. The system of claim 13, further comprising a vacuum source coupled to said vacuum passageway, said vacuum source is located upstream of said vacuum orifice.

15. The system of claim 14, further comprising a protuberance disposed on the interior surface of said filler neck from an opening of said filler neck for a predetermined distance along a length of said filler neck when the vehicle is equipped with said reductant tank, said protuberance occludes said vacuum orifice thereby preventing opening of said first valve when said nozzle is partially coupled with said filler neck.

16. The system of claim 15 wherein said predetermined distance is determined so that said vacuum orifice being inserted beyond said protuberance when said nozzle is fully coupled with said filler neck, said filler neck is fully coupled with said filler neck when said second stream delivery passageway and said second stream receiving passageway are coupled and capable of allowing said second stream to flow.

17. A method for a vehicle to be re-fueled, the method comprising:
   receiving a first stream of fuel in a fuel tank and a second, separate, stream of reductant in a reductant tank;
   stopping said receiving of said fuel when said fuel tank is filled to a first predetermined level; and
   stopping said receiving of said reductant when said reductant tank is filled to a second predetermined level.

18. The method of claim 17 wherein a first stream receiving passageway is coupled to said fuel tank, a second stream receiving passageway is coupled to said reductant tank, and a filler neck is coupled between an exterior surface of the vehicle and said first and second stream receiving passageways.

19. The method of claim 18 wherein a nozzle capable of supplying both said first and second streams of fluid is capable of being coupled to said filler neck.

* * * * *